United States Patent Office 2,917,406
Patented Dec. 15, 1959

2,917,406

METHOD OF INCREASING THE DISPERSIBILITY OF SLURRY PARTICLES

John P. McBride, Oak Ridge, Tenn., assignor to the United States of America as represented by the United States Atomic Energy Commission No Drawing. Application March 10, 1958
Serial No. 720,508

5 Claims. (Cl. 117—100)

My invention relates generally to a method for achieving particle dispersion in slurries and more particularly to a method of treating metallic oxide particles to achieve particle dispersion in aqueous slurries.

Thorium oxide slurries will be used in homogeneous neutronic reactors for breeding purposes, since thorium undergoes a reaction with a neutron to form a fissionable isotope of uranium $U^{233}$. One important requirement of thorium oxide slurries for neutronic reactor use is that they display low settling rates and easy dispersibility. Untreated thorium oxide slurries tend to flocculate at high temperatures, thereby causing an increase in the settling rate of the suspended particles. Additives such as sodium silicate have been incorporated in thorium oxide slurries to improve their dispersibility but it has been found that their effect on settling rate diminishes at high temperatures.

It is, therefore, an object of my invention to provide a method for treating metallic oxide particles to improve their dispersion characteristics in slurries.

A further object of my invention is to provide a method for treating thorium oxide particles to improve their dispersion characteristics in slurries, without affecting other particle characteristics necessary for neutronic reactor use.

These and other objects of my invention will be apparent from the following description of my invention and the claims appended thereto.

In accordance with my invention, I provide a method for treating metallic oxide particles to reduce the settling rate thereof in aqueous slurries, which comprises depositing on the surface of said particles an organo-silicon compound and firing the resulting coated particle at temperatures of 600–1200° C. to decompose said compound and remove the organic groups, whereby silica is bonded to the surface of said particles.

My invention is applicable to all refractory metallic oxide particles, such as the oxides of titanium, uranium, zirconium and magnesium, but is particularly applicable to thorium oxide.

Any organo-silicon compound is suitable for use in my invention. Examples of organo-silicon compounds are the organo-silicon halides, which include alkyl silicon halides; aryl silicon halides; aralkyl silicon halides, alkaryl silicon halides, alkyl halosilanes and aryl halosilanes; and silicate esters, which include compounds such as alkyl silicates and aryl silicates. Other organi-silicon compositions will be apparent to those skilled in the art. It is, however, preferable to use simple organo-silicon compounds such as the halosilanes, since the organic groups serve merely as a carrier for the silicon and are destructively removed in the firing step. Specifically, I have found that the commercially available product G.E. "Dryfilm SC-77," which is a mixture of 50 mol percent dimethyldichlorosilane and 50 mol percent methyltrichlorosilane, is one convenient composition which may be used.

The polyhalosilanes such as dimethyldichlorosilane and methyltrichlorosilane are particularly attractive compounds for use in the process which I provide because they polymerize, thereby forming silicon-oxygen linkages, and when used together, form a polymer having silicon-oxygen linkages in three dimensions. Although my invention is not to be understood as restricted to any particular theory, these compounds are postulated to react with adsorbed water on the surface of the oxide to form a diol or triol, as shown below.

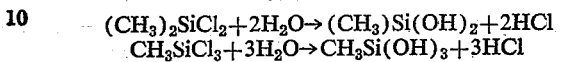

The diol splits out water to form the polymer in one step and the triol splits out water in two steps, forming an intermediate polymer.

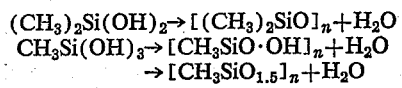

Firing the coated particles results in the removal of the methyl groups from the polymers, leaving silica bonded to the surface of the oxide particles.

In addition to the organo-silicon compounds, inorganic silicon compounds which decompose upon firing may be used as a silica deposition agent. The ammonium silicon compounds are examples of this type of agent.

The above-described compounds may be deposited on the oxide particles in any convenient manner, but when using volatile organic compounds, it is most convenient to simply bring the particles to be coated into contact with the vapors from the organo-silicon-compound, whereby the particles adsorb the compound on their surfaces. Alternatively, the adsorption may be accomplished in solutions of the compound.

The coated oxide should be fired at temperatures high enough to remove the organic carrier groups but low enough to avoid sintering of the oxide. In general, the firing temperatures may be suitably maintained between 600–1200° C. The firing temperature should be maintained for times sufficient to insure complete decomposition of the organic agent. Suitable times range from several hours to twenty-four hours or longer.

Generally, the settling rate of thorium oxide particles in aqueous slurries increases with a decrease in the specific surface area, as calculated from crystallite size. In the prior art, surface areas of thorium oxides have been dependent on firing temperature, the surface area decreasing with an increase in firing temperature.

Table I below displays the effect of silica coating on the characteristic properties of thorium oxide. Oxide A was not coated with silica and the properties given are representative of untreated oxides. Oxide B was silica-coated oxide A, and oxide C was another type thorium oxide which was silica coated. It can be seen that coating with silica does not result in an increase in particle size, but the silica treatment does inhibit the decrease in surface area and increase in crystallite size which formerly resulted in untreated oxides from an increase in the firing temperatures. However, at 1200° C, sintering of the oxide begins and firing at 1600° C. results in a completely sintered cake. Table I, therefore, shows that firing to remove the organic carrier groups used in my invention can be accomplished throughout the temperature range of 600–1200° C.

Table II below shows the slurry properties of various oxides after being autoclaved for 22 hours at 300° C. The oxides A, B, and C were identical to those of Table I. The settling rate, which is the rate at which the slurry-water interface falls, and settled concentration, which is the thorium oxide concentration in the

TABLE I

*Characteristic properties of silica-coated thorium oxide*

| Oxide | Treatment | Firing Temperature (° C.) | Particle [a] Size ($\mu$) | Surface Area ($m^2$/g.) | X-Ray Crystallite Size (A.) | Relative Surface [b] for $N_2$ Adsorption ($S/\theta$) |
|---|---|---|---|---|---|---|
| A | None | 650 | 2.1 | 33.5 | 115 | 0.64 |
|   |      | 800 |     | 13.1 | 263 | 0.58 |
|   |      | 1,000 | 3.1 | 6.5 | 745 | 0.81 |
| B | Silica-coated | 650 | 3.0 | 32.7 | 111 | 0.61 |
|   |      | 800 | 2.5 | 27.6 | 118 | 0.54 |
|   |      | 1,000 | 3.3 | 13.4 | 104 | 0.23 |
|   |      | 1,200 | 10 | 1.3 | 404 | 0.09 |
|   |      | 1,600 |    | 0.24 |     |      |
| C | Silica-coated | 650 | 0.9 | 28.8 | 100 | 0.48 |
|   |      | 800 | 0.9 | 24.9 | 105 | 0.44 |
|   |      | 1,000 | 1.0 | 17.4 | 111 | 0.32 |
|   |      | 1,200 | 1.0 | 1.6 | 530 | 0.14 |

[a] Measured by sedimentation rate in dilute suspension of 0.005 M $Na_4P_2O_7$.
[b] Relative area of the crystallite available for $N_2$ adsorption: $S/\theta = (1.67 \times 10^{-4})$ (X-ray crystallite size) (surface area).

slurries, as shown in the two columns at the right, are indicative of the slurry quality. Highly dispersed slurries settle to the most dense beds and highly flocculated slurries settle to the least dense beds. Therefore, high values of settled concentration indicate high dispersion while low values are indicative of flocculation. It can be seen that the slurries formed from coated oxides manifested extremely low settling rates and high dispersions, while the untreated oxide settled rapidly with flocculation.

TABLE II

*Slurry properties of silica-coated thorium oxide*

[Conditions: 250 g. Th/kg. $H_2O$. Autoclaved 22 hr., 300° C.]

| Oxide | Treatment | Firing Temperature (° C.) | pH | Settling Rate (cm./sec.) | Settled Concentration (g. Th/kg. $H_2O$) |
|---|---|---|---|---|---|
| A | None | 650 | [a] 8.3 | [a] 0.03 | 1,300 |
|   | None | 800 | 6.6 | 0.06 | 1,350 |
|   | None | 1,000 | 7.1 | 0.08 | 1,750 |
| B | Silica-coated | 650 | 5.9 | (b) | 1,900 |
|   |      | 800 | 4.6 | (b) | 2,050 |
|   |      | 1,000 | 6.3 | (b) | 1,850 |
|   |      | 1,200 | 6.1 | 0.0002 | 2,000 |
| C | Silica-coated | 650 | 3.9 | (b) | 1,700 |
|   |      | 800 | 4.3 | (b) | 1,950 |
|   |      | 1,000 | 4.2 | (b) | 2,150 |
|   |      | 1,200 | 5.1 | (b) | 3,050 |

[a] 500 g. Th/kg. $H_2O$.
[b] Settling rate too slow to read conveniently.

Thorium oxides which are prepared for reactor use must have low chloride ion contents; therefore, it is essential that the chloride ion introduced by the chlorosilanes be removed. In the example given below, one convenient method of removal is described together with the description of one manner in which oxides in general may be coated.

EXAMPLE

Thorium oxide was exposed overnight in a desiccator to the vapors of a mixture of 50 mol percent dimethyldichlorosilane and 50 mol percent of methyltrichlorosilane and then heated at 150° C. for approximately 5 hours to induce polymerization and remove HCl. The resulting material was washed six times with 6 N $NH_4OH$, to which alcohol had been added to improve wetting, washed several times with 3 N $NH_4OH$, and finally with water to insure removal of the chloride ion. The washed product was dried overnight at 150° C. and fired at 650° C. for 24 hours. The resulting product was a free flowing white powder containing less than 10 p.p.m. of chloride ion, and formed highly dispersed slurries having extremely low settling rates.

If the chloride ion is not objectionable, the heating and washing steps can be eliminated with no effect on the slurry properties of the final composition.

Although I have described my invention as being particularly applicable to thorium oxides and have set forth desirable compositions and concentrations, it is to be understood that many deviations may be made within the scope of my invention. Accordingly, my invention should be limited only as indicated in the appended claims.

Having thus described my invention, I claim:

1. A method of treating metallic oxide particles to reduce the settling rate thereof in aqueous slurries, which comprises depositing at least one organo-silicon compound on the surface of said particles and firing the resulting coated particle at temperatures between approximately 600° C. and approximately 1200° C.

2. A method of treating thorium oxide particles to reduce the settling rate thereof in aqueous slurries, which comprises depositing at least one organo-silicon compound on the surface of said particles and firing the resulting coated particle at temperatures between approximately 600° C. and approximately 1200° C.

3. The method of claim 2 wherein the organo-silicon compounds are selected from the alkyl silicon halides.

4. The method of claim 2 wherein the organo silicon compounds are selected from the alkyl halosilanes.

5. The method of claim 2 wherein the organo silicon compounds are methyltrichlorosilane and dimethyldichlorosilane.

References Cited in the file of this patent

UNITED STATES PATENTS

| | | |
|---|---|---|
| 2,424,853 | Safford | July 29, 1947 |
| 2,563,555 | Safford | Aug. 7, 1951 |